United States Patent
Campbell et al.

(10) Patent No.: US 9,811,516 B2
(45) Date of Patent: Nov. 7, 2017

(54) LOCATION AWARE SPREADSHEET ACTIONS

(75) Inventors: John Campbell, Renton, WA (US); Amy Lin, Redmond, WA (US); Lawrence Waldman, Seattle, WA (US); Sherman Der, NewCastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 12/967,972

(22) Filed: Dec. 14, 2010

(65) Prior Publication Data

US 2012/0151314 A1    Jun. 14, 2012

(51) Int. Cl.
*G06F 17/00*  (2006.01)
*G06F 17/24*  (2006.01)
*H04M 1/725* (2006.01)
*G06F 1/16*   (2006.01)
*H04M 1/2745* (2006.01)

(52) U.S. Cl.
CPC .......... *G06F 17/246* (2013.01); *G06F 1/1698* (2013.01); *G06F 17/24* (2013.01); *H04M 1/274516* (2013.01); *H04M 1/7253* (2013.01)

(58) Field of Classification Search
CPC ...... G06F 17/24; G06F 17/246; G06F 1/1698; H04M 1/274516; H04M 1/7253
USPC ........ 715/201, 212, 227, 209, 210, 273, 255
See application file for complete search history.

(56) References Cited

U.S. PATENT DOCUMENTS

| | | | |
|---|---|---|---|
| 6,138,130 A | 10/2000 | Adler et al. | 715/210 |
| 6,157,934 A * | 12/2000 | Khan | G06Q 10/10 709/203 |
| 6,292,810 B1 | 9/2001 | Richards | |
| 6,323,853 B1 | 11/2001 | Hedloy | |
| 6,829,615 B2 | 12/2004 | Schirmer et al. | |
| 7,084,758 B1 | 8/2006 | Cole | 340/539.11 |
| 7,099,890 B2 | 8/2006 | Cahill et al. | |
| 7,155,665 B1 | 12/2006 | Browne et al. | 715/243 |
| 7,336,942 B2 | 2/2008 | Wang | |

(Continued)

FOREIGN PATENT DOCUMENTS

| | | |
|---|---|---|
| CN | 1609866 A | 4/2005 |
| CN | 1755679 A | 4/2006 |

(Continued)

OTHER PUBLICATIONS

Microsoft, "How to convert degrees/minutes/seconds angles to or from decimal angles in Excel 2000", Microsoft, Nov. 23, 2006, 3pp.*

(Continued)

*Primary Examiner* — Cesar Paula
*Assistant Examiner* — David Faber (57) ABSTRACT

Location information is integrated with spreadsheet formulas and operations. Location information may be used in filtering data, detecting data sources, performing calculations, and the like. The data may be filtered by location, individuals, places, and other location based information. The location information may be integrated into native spreadsheet formulas to perform calculations, trigger alerts, or drive other spreadsheet business logic. The location information may also be used to detect and use nearby data sources that are published near the spreadsheet user.

20 Claims, 5 Drawing Sheets

(56) References Cited

U.S. PATENT DOCUMENTS

| | | | |
|---|---|---|---|
| 7,433,967 B2 | 10/2008 | Anson et al. | 709/240 |
| 7,756,824 B2 | 7/2010 | Campbell | |
| 7,774,002 B1* | 8/2010 | Ortega | H04W 4/02 455/414.3 |
| 7,783,645 B2 | 8/2010 | Hess et al. | 707/751 |
| 7,930,626 B2* | 4/2011 | Serra | G06F 17/246 702/85 |
| 8,032,125 B2 | 10/2011 | Wisebourt et al. | |
| 8,219,028 B1* | 7/2012 | Flamholz | G06F 1/1694 455/41.2 |
| 8,332,878 B2 | 12/2012 | Harm | |
| 8,964,947 B1* | 2/2015 | Noolu | H04M 3/541 379/88.01 |
| 9,129,234 B2 | 9/2015 | Campbell et al. | |
| 9,330,080 B2* | 5/2016 | Muenkel | G06F 17/246 |
| 2002/0091730 A1 | 7/2002 | Bedford et al. | |
| 2002/0143780 A1* | 10/2002 | Gorman | G06F 17/246 |
| 2003/0144793 A1 | 7/2003 | Melaku | |
| 2003/0200308 A1 | 10/2003 | Tameda | |
| 2003/0226105 A1 | 12/2003 | Waldau | 715/212 |
| 2004/0038664 A1 | 2/2004 | Stoks | 455/404.1 |
| 2005/0097447 A1 | 5/2005 | Serra et al. | |
| 2005/0246339 A1 | 11/2005 | Kamegaya et al. | |
| 2005/0273695 A1 | 12/2005 | Schnurr | |
| 2006/0004727 A1 | 1/2006 | Antila et al. | |
| 2006/0099966 A1 | 5/2006 | Moton et al. | 455/456.3 |
| 2006/0218029 A1 | 9/2006 | Chin | 705/8 |
| 2007/0029956 A1 | 2/2007 | Hofer | |
| 2007/0050699 A1 | 3/2007 | Simkhay et al. | |
| 2007/0075965 A1* | 4/2007 | Huppi | H04M 1/72563 345/156 |
| 2007/0136666 A1 | 6/2007 | Khen et al. | |
| 2007/0219956 A1 | 9/2007 | Milton | |
| 2008/0016436 A1* | 1/2008 | Liu | H04L 67/34 715/212 |
| 2008/0016440 A1* | 1/2008 | Liu | H04L 41/0266 715/700 |
| 2008/0071467 A1 | 3/2008 | Johnson et al. | |
| 2008/0125981 A1* | 5/2008 | Steinke | E21B 10/00 702/34 |
| 2008/0132251 A1 | 6/2008 | Altman | |
| 2008/0134030 A1 | 6/2008 | Kansal et al. | |
| 2008/0162198 A1 | 7/2008 | Jabbour | |
| 2008/0171559 A1 | 7/2008 | Frank et al. | 455/456.5 |
| 2008/0182599 A1 | 7/2008 | Rainisto | |
| 2008/0235349 A1 | 9/2008 | Caspi et al. | |
| 2009/0044095 A1* | 2/2009 | Berger | G06F 17/30569 715/226 |
| 2009/0112937 A1 | 4/2009 | Campbell | |
| 2009/0112990 A1* | 4/2009 | Campbell | G06F 17/246 709/205 |
| 2009/0143056 A1* | 6/2009 | Tang | H04M 1/7253 455/418 |
| 2009/0172553 A1 | 7/2009 | Sikka et al. | 715/733 |
| 2009/0177744 A1 | 7/2009 | Marlow et al. | |
| 2009/0307190 A1* | 12/2009 | Maresca | G06F 9/543 |
| 2009/0313250 A1* | 12/2009 | Folting | G06F 17/30389 |
| 2009/0319616 A1 | 12/2009 | Lewis | |
| 2010/0069096 A1 | 3/2010 | Poola | |
| 2010/0115035 A1 | 5/2010 | Malhar et al. | 709/206 |
| 2010/0128855 A1 | 5/2010 | Demo | |
| 2010/0205269 A1 | 8/2010 | Poozhiyil et al. | |
| 2010/0306179 A1 | 12/2010 | Lim | |
| 2011/0145739 A1* | 6/2011 | Berger | G06F 17/243 715/763 |
| 2011/0243125 A1 | 10/2011 | Kaal | |
| 2011/0252320 A1* | 10/2011 | Arrasvuori | G06F 1/1626 715/704 |
| 2011/0264648 A1 | 10/2011 | Gulik | |
| 2012/0023390 A1 | 1/2012 | Howes | |
| 2012/0072494 A1 | 3/2012 | Wong | |
| 2012/0072855 A1 | 3/2012 | Baldwin | |
| 2012/0131645 A1* | 5/2012 | Harm | G06F 21/6218 726/4 |
| 2012/0144300 A1* | 6/2012 | Harm | 715/704 |
| 2012/0151315 A1 | 6/2012 | Campbell | |
| 2012/0192050 A1 | 7/2012 | Campbell | |
| 2013/0007118 A1 | 1/2013 | Rochelle | |
| 2015/0347373 A1 | 12/2015 | Campbell et al. | |

FOREIGN PATENT DOCUMENTS

| | | |
|---|---|---|
| CN | 1794231 A | 6/2006 |
| CN | 10145477 A | 6/2009 |
| CN | 102725750 | 10/2012 |
| CN | 102725750 A | 10/2012 |
| JP | 06301446 A | 10/1994 |
| JP | 2001-109810 A | 4/2001 |
| JP | 2003032718 A | 1/2003 |
| JP | 2004-208278 A | 7/2004 |
| JP | 2005122575 A | 5/2005 |
| JP | 2005316714 A | 11/2005 |
| JP | 2008-082883 A | 4/2008 |
| RU | 2358312 C2 | 6/2009 |
| RU | 2387003 C2 | 4/2010 |
| WO | WO2010115204 | 10/2010 |
| WO | 2011084416 A2 | 7/2011 |

OTHER PUBLICATIONS

Lieberman et al, "Spatio-Textual Spreadsheets:Geotagging via Spatial Coherence", Nov. 4-6, 2009, ACM, pp. 524-527.*
Openoffice.org, "Sorting and Filtering Data", Dec. 8, 2006, p. 331-339 + 1 page http://openoffice.blogs.com/brookresources/chapters/book_calcsortingfiltering.pdf http://openoffice.blogs.com/brookresources/2006/12free_openoffice.html.*
Baycon Group, "Lesson 4: Sorting, Filtering, and Creating Relationships", online as of Jan. 2, 2010, 11 pages.*
Choi, et al.; Multi-Paradigm Spreadsheet for End Users—Published Date: Apr. 2006; http://paper.ijcsns.org/07_book/200604/200604A06.pdf; 6 pgs.
GroupSMSIndia.com; Excel Plug-In—Retrieved Date: Oct. 13, 2010; http://www.groupsmsindia.com/excel-plugin.html; 1 pg.
J. Walk & Associates, Inc.; Sending Personalized Email From Excel—Retrieved Date: Oct. 18, 2010; http://spreadsheetpage.com/index.php/tip/sending_personalized_email_from_excel/; 3 pgs.
Noyes, K.; Google Latitude Lets Users Follow Their Own Footprints—Published Date: Nov. 11, 2009; TechNewsWorld; http://mashable.com/2009/11/10/google-latitude-features/; 3 pgs.
Obrenovic, et al.; End-User Service Computing: Spreadsheets as a Service Composition Tool—Published Date: Dec. 17, 2008; http://citeseerx.ist.psu.edu/viewdoc/download?doi=10.1.1.154.7998&rep=rep1&type=pdf; 14 pgs.
PageOne.Co.Uk; 2 Way SMS from Your PC—Retrieved Date: Oct. 13, 2010; http://www.pageone.co.uk/services/connect/excel-plug-in; 1 pg.
PCWorld.com; Location-Based Mobile Service Helps You Remember—Published Date: May 5, 2009; http://www.pcworld.com/article/164309/locationbased_mobile_service_helps_you_remember.html; 4 pgs.
SMSCountry SMS-Excel Plugin—Retrieved Date: Oct. 13, 2010; http://www.smscountry.com/excel_download_info.asp; 2 pgs.
StrikeIronBlog; Using Microsoft Excel to Send an SMS Text Message to a List of Recipients—Published Date: Jul. 11, 2009; http://strikeiron.typepad.com/strikeiron_blog/2009/07/using-microsoft-excel-to-send-an-sms-text-message-to-a-list-of-recipients.html; 2 pgs.
PageOne, "SMS plug-in for Microsoft® Excel®: User Guide", Version 3.0; 30pgs, http://www.pageone.co.uk/downloads/guides/SMS_Plug-in_Excel_User_Guide_v3.0.pdf; published Mar. 9, 2010 shown using Wayback Archive documentation, pp. 1-3; http://web.archive.org/web/201 00309003140/http://www.pageone.co.uk/support/down loads/manuals-and-gu ides; 33p total.
Office Action dated Jul. 2, 2013, issued in U.S. Appl. No. 12/967,991, 22 pp.
Office Action dated Oct. 29, 2013, issued in U.S. Appl. No. 13/012,335, 15 pp.

(56) References Cited

OTHER PUBLICATIONS

Chinese Third Office Action dated Dec. 31, 2014 cited in Appl. No. 201110436694.X, 13 pgs., /w English transition of the first 2 pages of the Chinese office action.
Chinese Second Office Action dated Jul. 14, 2014 cited in Appl. No. 201110436694.X w/ English language translation, 16 pgs.
Chinese Second Office Action dated Sep. 12, 2014 cited in Application No. 201110436744.4, 6 pgs., /w English transition of the first 2 pages of the Chinese office action.
Chinese Third Office Action dated Dec. 10, 2014 cited in Appl. No. 201210019825.9, 8 pgs., w/ English transition of the first 2 pages of the Chinese office action.
Extended European Supplementary Search Report dated Sep. 23, 2014 cited in Application No. 12739904.6, 6 pgs.
U.S. Office Action dated Nov. 3, 2014 cited in U.S. Appl. No. 13/012,335, 28 pgs.
Chinese Second Office Action dated Jun. 17, 2014 cited in Appl. No. 201210019825.9, 12 pgs., w/English language translation of 4 of 7 pgs of the Chinese office action.
U.S. Final Office Action dated Jun. 11, 2014 cited in U.S. Appl. No. 13/012,335, 15 pgs.
Office Action dated Feb. 2, 2015 cited in U.S. Appl. No. 12/967,991, 52 pgs.
Greentext, "SMSbroadcast," 1 page, published as early as Sep. 28, 2010 shown using Wayback Archive, http://web.archive.org/web/20100928002328/http://www.gntext.com/Applications/SMSBroadcast.aspx.
Chinese First Office Action dated Jan. 6, 2014 cited in Appl. No. 201210019825.9, w/ English language translation, 9 pgs.
Chinese First Office Action dated Jan. 9, 2014 cited in Appl. No. 201110436694.X, w/English language translation, 18 pgs.
Chinese First Office Action dated Jan. 30, 2014 cited in Appl. No. 201110436744.4, w/ English language translation, 13 pgs.
U.S. Final Office Action dated Feb. 19, 2014 cited in U.S. Appl. No. 12/967,991, 31 pgs.
Microsoft Press, "Microsoft Computer Dictionary: S", published Mar. 15, 2002, Microsoft Press, 67 pgs.
Chinese Notice on Grant dated Jan. 20, 2015 cited in Appl. No. 201110436744.4, w/English language translation, 4 pgs.
Chinese Fourth Office Action dated Apr. 27, 2015 cited in Appl. No. 201110436694.X, w/ English language translation, 13 pgs.
Notice of Allowance dated Apr. 24, 2015 cited in U.S. Appl. No. 13/012,335, 35 pgs.
Office Action dated Jun. 4, 2015 cited in U.S. Appl. No. 12/967,991, 35 pgs.
Chinese Decision on Rejection dated Oct. 10, 2015 cited in Appl. No. 201110436694.X, w/ English language translation, 14 pgs.
Cheung, S.L., "Using mobile phone messaging as a response medium in classroom experiments", The Journal of Economic Education 39.1 (2008): pp. 51-67, [retrieved from internet on Mar. 29, 2016] <URL: https://cyfar.org/sites/default/files/Cheung%202008.pdf>.
Chinese Notice on Grant dated Jun. 25, 2015 cited in Appl. No. 201210019825.9, w/English language translation, 4 pgs.
Japanese Office Action Issued in Patent Application No. 2013-544537, dated Jan. 5, 2016, 4 Pages.
Japanese Office Action Issued in Patent Application No. 2013-544541 dated Jan. 6, 2016, 6 Pages.
Australian Office Action Issued in Patent Application No. 2011341505 dated Mar. 29, 2016, 5 Pages.
European Office Action Issued in Patent Application No. 12739904.6 dated Mar. 22, 2016, 7 Pages.
Japanese Office Action Issued in Patent Application No. 2013-544541 dated Aug. 8, 2016, with English translation, 6 Pages.
Australian Office Action Issued in Patent Application No. 2011341497, dated Mar. 30, 2016, 5 pages.
Australian Office Action Issued in Patent Application No. 2011341505, dated May 9, 2016, 4 pages.
Chinese Fifth Office Action dated Apr. 5, 2016 cited in Appl. No. 201110436694.X, with English translation, 7 pgs.
Chinese Office Action and Search Report Issued in Patent Application No. 201110436694.X, dated Jul. 14, 2016, 16 Pages.
SMS & Co, "SMSLibX—SMS tutorials—Sending SMS from Excel", [retrieved from internet on Mar. 29, 2016] <URL: https://web.archive.org/web/20101112005436/http://www.smsco.it/tomcat/en/sms_tutorials/sms_from_excel.jsp> published on Nov. 12, 2010 as per Wayback Machine. 3 pages.
U.S. Appl. No. 12/967,991 Office Action dated Jun. 16, 2016, 33 pgs.
Australian Office Action Issued in Patent Application No. 2011341505, dated Jun. 14, 2016, 4 pages.
Russian Notice of Allowance Issued in Patent Application No. 2013127120, dated May 24, 2016, with English translation, 18 pages.
Hong Kong Certificate of Grant issued in Patent Application No. 13101087.7, dated May 27, 2016, 3 pages.
Russian Notice of Allowance in Application 2013127117, dated Sep. 22, 2016, 18 pages.
Chinese Notice of Allowance in Application 201110436694.X, dated Nov. 15, 2016, 4 pages.
ACM, "From e-commerce to m-commerce: the power of the mobile internet: References", ACM, 3 pages, http://dl.acm.org/citation.cfm?id=644418.
Australian Notice of Acceptance Issued in Patent Application No. 2011341505 dated Jul. 20, 2016, 3 Pages.
Le Bodie, Gwenael, "Mobile Messaging Technologies and Services SMS, EMS and MMS", 2005, John Wiley & Son, Second Ed., 455 pgs.
Mobile Streams, "Next Messaging: An Introduction to SMS, EMS and MMS", 2000, 25 pages.
Novak et al., "MMS-Building on the success of SMS", Ericsson, 2001, pp. 102-109, https://www.ericsson.com/ericsson/corpinfo/publications/review/2001_03/files/2001031.pdf.
PCT International Search Report and Written Opinion in International Application PCT/US2011/063099, dated Jul. 31, 2012, 9 pgs.
PCT International Search Report and Written Opinion in International Application PCT/US2012/022136, dated Jul. 31, 2012, 10 pgs.
PCT International Search Report and Written Opinion in International Application PCT/US2011/063199, dated Jun. 18, 2012, 10 pgs.
Russian Office Action Issued in Patent Application No. 2013127120, dated Nov. 11, 2015, 7 pages With English Summary.
Russian Office Action Issued in Russian Patent Application No. 2013127117, dated Nov. 26, 2015, 7 pages with English Summary.
SMS & Co, "SendSMS_multi.xls", [retrieved from internet on Mar. 29, 2016] <URL: https://web.archive.org/web/20101112005436/http://www.smsco.it/tomcat/download/sms_tutorials/SMSLibX_with_Excel.zip> published on Nov. 12, 2010 as per Wayback Machine, 10 pages with cover page.
U.S. Appl. No. 12/967,991, Notice of Allowance dated Dec. 19, 2016, 16 pgs.
Wakefield et al "Introduction to Mobile Communications: Technology, Services, Markets", Auerbach Publications, 2007, 437 pgs.
U.S. Appl. No. 12/967,991, Supplemental Notice of Allowance dated Feb. 9, 2017, 5 pgs.
U.S. Appl. No. 14/825,775, Office Action dated Oct. 25, 2016, 18 pages.
U.S. Appl. No. 14/825,775, Notice of Allowance dated Apr. 12, 2017, 5 pgs.

\* cited by examiner

LOCATION AWARE SPREADSHEET ACTIONS

BACKGROUND

Many people utilize spreadsheets to interact with data. Today, not only do users interact with spreadsheets using desktop computers but they also interact with spreadsheets using portable devices. For example, users may use their smart phone, laptops and tablets to interact with a spreadsheet.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Location information is integrated with spreadsheet formulas and operations. Some examples of integrating location information include, but are not limited to, using location information in filtering data, detecting data sources, performing calculations, and the like. The data may be filtered by location, individuals present at a location, places, and other location based information. The location information may be integrated into native spreadsheet formulas to perform calculations, trigger alerts, or drive other spreadsheet business logic. The location information may also be used to detect and use nearby data sources that are published near the spreadsheet user.

BRIEF DESCRIPTION OF THE DRAWINGS

FIG. 3 shows an example spreadsheet with location filtering on;

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
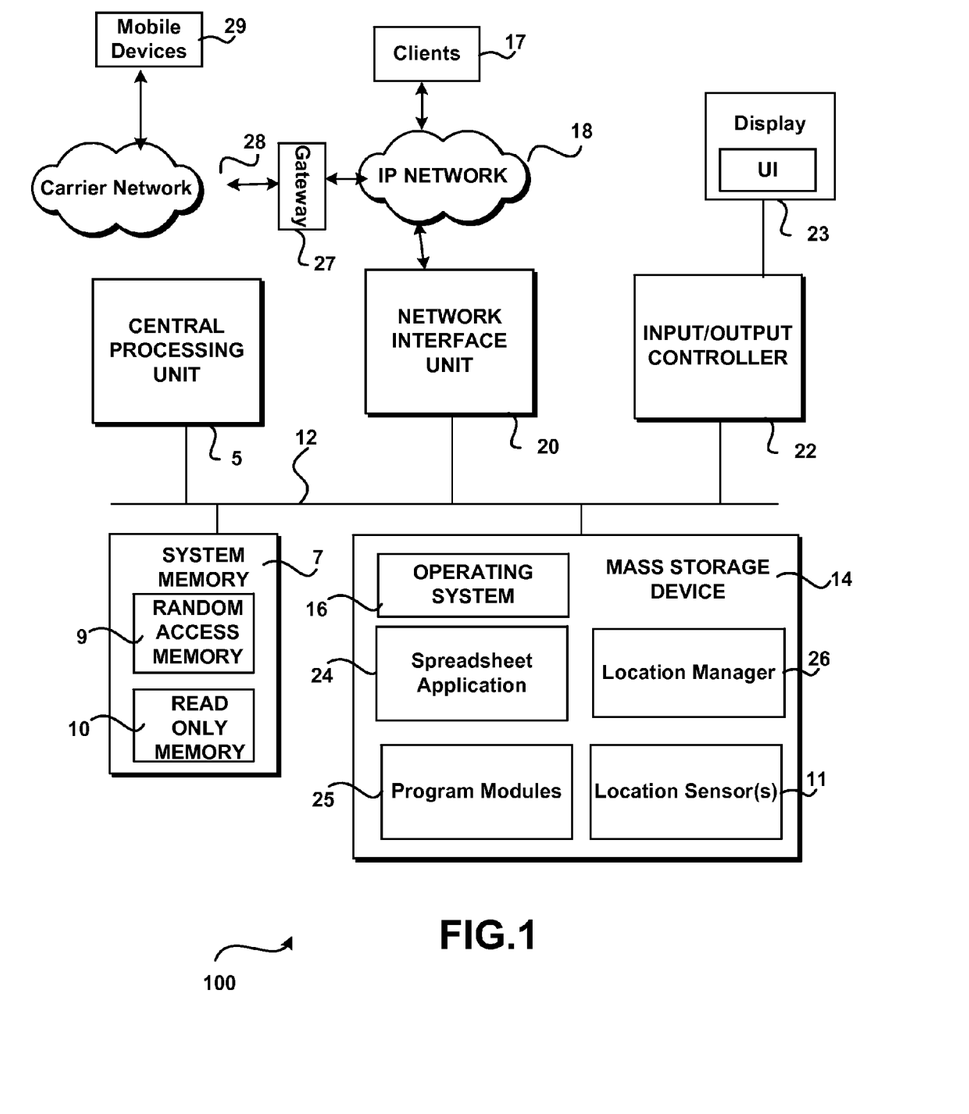
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet application 24, other program modules 25, and location manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of output device.

Carrier network 28 is a network responsible for communicating with mobile devices 29. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like. Some of these communications may be messages. For example, a message may be a short message service ("SMS") message, an Enhanced Messaging Service (EMS) message, a multimedia messaging service ("MMS"), and the like. As used herein, the term "text message" refers to SMS messages, MMS messages and EMS messages and other types of short messages. Gateway 27 routes messages between carrier network 28 and IP Network 18.

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. Any spreadsheet application may be used. According to an embodiment, MICROSOFT EXCEL® is used.

Location manager 26 is configured to manage location information that is associated with a spreadsheet application, such as spreadsheet application 24. Location information may be obtained from one or more sources. For example, location information may be obtained from location sensor(s) 11 or from other location source(s). The location sensor(s) may be any sensor that provides location based information, such as a global positioning system (GPS). The location information may also be provided externally from the computing device. This location information may be an estimate of the location of the user (i.e. based on an IP address, a last known location, and the like) or more accurate information (i.e. location provided by cellular service). Generally, any method of determining location information may be used.

The location information may be used in spreadsheet application 24 for filtering data, detecting data sources, performing calculations, and the like. The data may be filtered by location, individuals, places, and other location based information. The location information may be integrated into native spreadsheet formulas to perform calculations, trigger alerts, or drive other spreadsheet business logic. The location information may also be used to detect and use nearby data sources that are published near the spreadsheet user.

Figure 2:
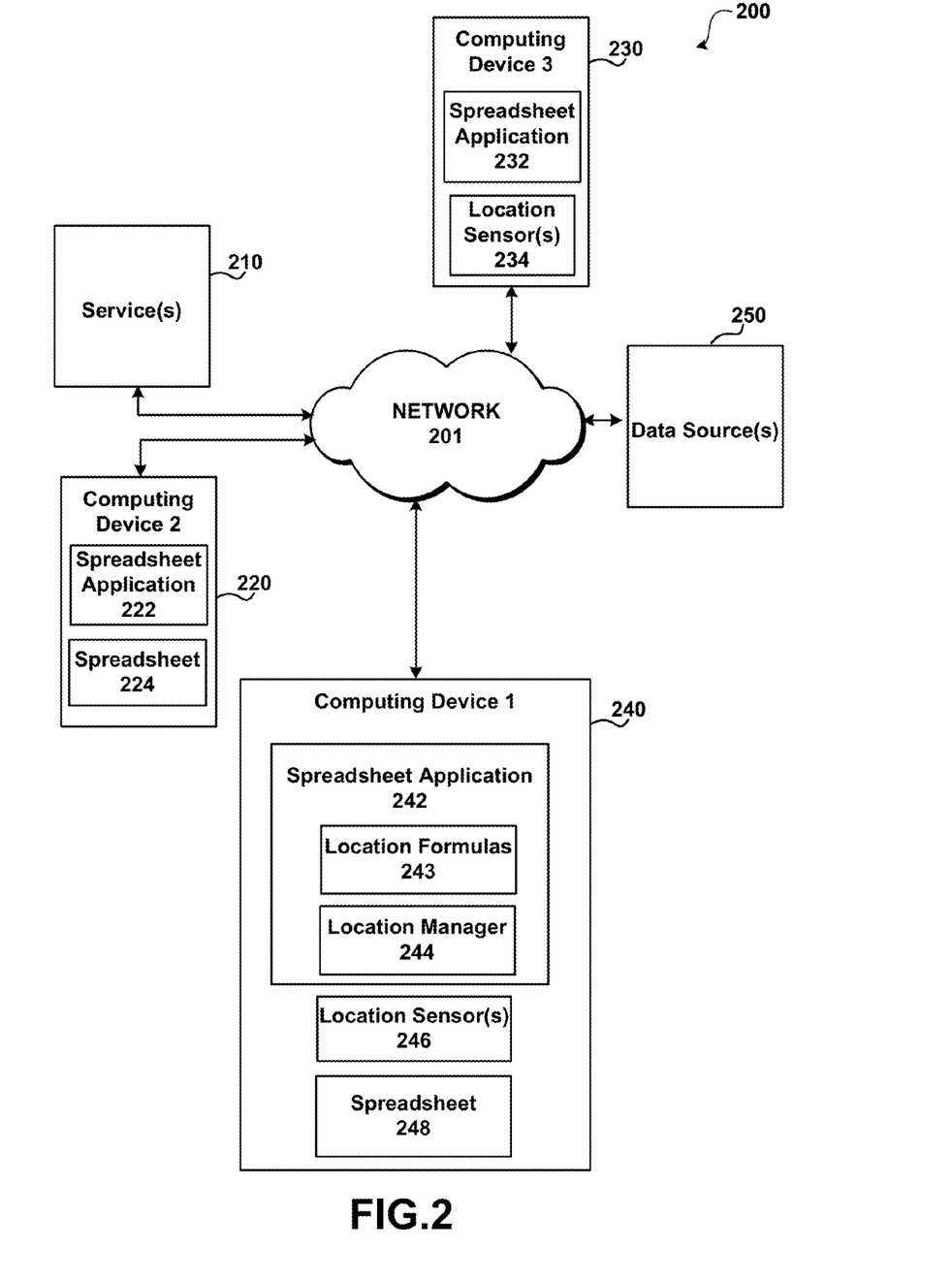
FIG. 2 shows a system for location aware spreadsheet actions.

FIG. 2 shows a system for location aware spreadsheet actions. As illustrated, system 200 includes computing device 1 (240) including spreadsheet application 242, location sensor(s) 246 and spreadsheet 248, computing device 2 (220) including spreadsheet application 222 and spreadsheet 224, computing device 3 (230) including spreadsheet 232 and location sensor(s) 234, service(s) 210 and data source(s) 250. Computing devices 1-3 are coupled through Network 201. Each of the computing devices includes a spreadsheet application that is location aware. While only computing device 1 is shown including location manager 244, each of the computing devices may include the functionality of a location manager. The location manager may be a part of a spreadsheet application or the functionality of the location manager may be external to the spreadsheet application. The computing devices may include other application programs that interact with a location aware spreadsheet application. For example, the computing devices may include an email program, a text messaging program, an instant messaging program, a web browser, a mapping program, a spreadsheet viewing program, and the like.

Location information may be provided to the computing devices by the use of location sensor(s), such as location sensor(s) 246 and/or through other methods. For example, a computing device could access a computing service, such as a location service provided by service(s) 210, to obtain location information (e.g. a cellular company provides the location to the device). A computing device may also estimate its location. The location information may be estimated based on an IP address, a last known location, a user inputted location, and the like. According to an embodiment, a GPS sensor is used by a computing device to obtain location information.

Service(s) 210 may provided different services that may be utilized by the computing devices. The services may include a search service, a cloud based service (e.g. an online spreadsheet service), a location based service, or some other service. For example, a computing device, such as computing device 3 may access a spreadsheet that is stored in a data store of an online service.

The location aware spreadsheet, such as spreadsheet application 242, is configured to convert location information into other location representations. For example, GPS coordinates may be converted to a name of a place (i.e. street, building, county, city, state, country, park, and the like). The conversions may be performed local to the computing device and/or external to the computing device (i.e. a location based service is used).

The location aware spreadsheet application is also configured to determine a location of people. For example, the user of computing device 1 may store a list of people that they are interested in knowing the location of and sharing information with. The people to capture the location data of may be determined in many different ways. For example, determining names contained within a spreadsheet, determining names from a user-defined list, accessing contacts on the computing device, accessing contacts in an IM client, using other contact lists that are associated with the user, or through any software or hardware that keeps a list of contacts (e.g. social networking sites).

The locations of the people within the list may be provided through a location based service, a website, a cellular company, user inputted location information and the like. The location aware spreadsheet application may be notified when a person is within a designated area and/or provided with updates as the people move locations. Formulas to capture the location of other spreadsheet users may be done using a push or pull mechanism.

The location aware spreadsheet application is configured to automatically incorporate the location information such that users may more easily perform useful operations that are related to location context. A set of native location formulas 243 are used by location aware spreadsheet applications, such as spreadsheet application 242. The location formulas may comprise many different types of formulas. For example, a set of conversion formulas to convert location data from one type to another type (i.e. GPS to city, building to GPS), formulas to obtain location information directly from the device and off of the device, formulas to locate other people, formulas to trigger spreadsheet operations, formulas for detecting data sources, user interface filtering and sorting formulas, user interface surfacing formulas and the like. For example, a location formula may specify that when a user is located in Oregon then a sum of three numbers within the spreadsheet is calculated and when the user is not in Oregon, then an average of a column number is calculated. The location formulas may be used with values/objects that are associated with a spreadsheet.

A data source to connect to may also be specified. For example, a user interface may be used to present available data sources and connect to one or more of the available data sources. The data sources may be presented within a user interface when the data sources become available (e.g. data source is near user's current location).

The formulas to trigger actions based on location data are configured to perform some operation(s) upon the location information satisfying a predefined condition. Logic may be associated with the location formulas that specify when the action is to be performed (i.e. a user is within a predefined location, outside of the predetermined location, another user is within a specified location, a data source is published at a location close to the user, and the like). The actions triggered may be many different types of events. For example, when a user moves within or out of a predetermined location, a communication with one or more other users may automatically be triggered (e.g. sending an email, a text, posting a message to a network). The triggered actions may also relate to saving data, accessing a published data source that is at the location, accessing another user's spreadsheet that is within a predetermined distance, or performing other operations that may be defined by business logic contained in formulas. These actions may also be conditionally performed based on further spreadsheet logic. The location based formulas may also be combined with any of the other spreadsheet formulas using the formula syntax and behavior that is associated with the other spreadsheet formulas.

The detect data sources formulas are configured to determine when a data source that may be utilized by the location aware spreadsheet application is available. For example, a user may enter a room for a meeting in which another user of the meeting has published a data source that may be relevant to the meeting. A user may attend a sporting event that publishes a data source relating to game statistics. A user may attend a conference in which the conference has published one or more data sources. These data sources may be published over a network that is available to the user.

The surface data sources functions may surface other data sources that are based on the location of the user and other users. For example, users may collaborate with and use values that are stored in another user's spreadsheet that is nearby (i.e. one spreadsheet user may use data within another spreadsheet user's spreadsheet).

The location filtering functions may automatically filter data based on the location of a user. Based on location information certain values/rows/columns within the spreadsheet may be shown or not shown. For example, a spreadsheet may be used by a salesman that travels to different clients that are located in Washington, Oregon and California. When the salesman is in Washington visiting a client, the filtering function may automatically filter the spreadsheet to only show the data relevant to Washington. The filtering may be set to filter based on different granularity levels. For example, the filtering may be per company, per building, per city, state, county, country and the like. The granularity level that is displayed may be user defined and/or automatically generated. For example, a smallest granularity level may be automatically selected and/or a portion of available granularity levels may be used.

According to an embodiment, the spreadsheet itself does not need to be created in a location aware manner. For example, the column/rows that may represent location do not need to be specifically enabled to be a "location" column. Instead, the spreadsheet application 242 accesses a spreadsheet, such as spreadsheet 248, and searches for identifiers that may be associated with location values (e.g. strings that represent city, state, region, person, and the like) and automatically enables these rows/columns to be filtered based on the location information. When the location manager determines that a string or other data type (e.g. longitude/latitude) within the spreadsheet relates to a location, this value/row/column may be automatically/manually filtered/sorted using the location information. The spreadsheet may also be specifically enabled for location information. For example, when a user creates a new value, the user may specify that the value is location enabled. A value/row/column may be specified as a location type (e.g. GPS type).

As discussed, the location aware spreadsheet may also detect other spreadsheet users near the computing device. The user may collaborate with the spreadsheet users that are within the predetermined location. A location may be determined for each person or a portion of the people. For example, when a person is known to be a significant distance that is outside of the predetermined area, that person may not be tracked for a period of time.

Figure 3:
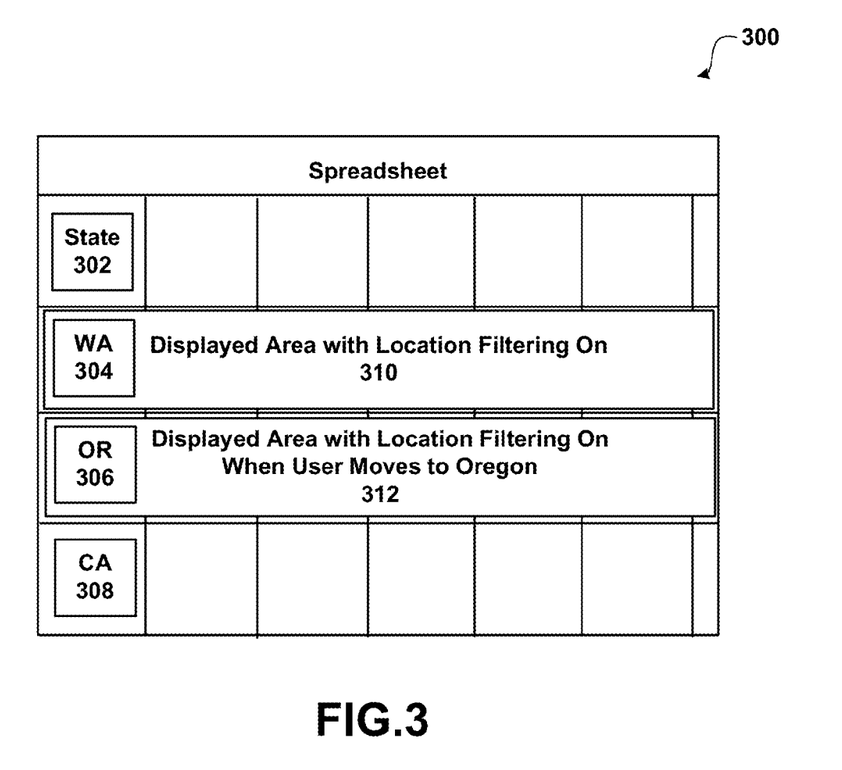

FIG. 3 shows an example spreadsheet 300 with location filtering on. As illustrated, spreadsheet 300 shows different state information for Washington, Oregon and California. Spreadsheet 300 shows a row for state 302, WA 304, OR 306 and CA 308. As discussed above, a spreadsheet may automatically filter data based on location information. For example, when a user is located in Washington, the Washington information may be displayed (310) in spreadsheet 300 without showing the other state information. As the user's location changes, the spreadsheet may be automatically refiltered and the view automatically updated. For example, when the user moves locations from Washington to Oregon, the Oregon information may be displayed (312) without showing the other state information.

The filtering may relate to people, places, and/or other physical objects. For example, a spreadsheet may have a user column that includes a list of spreadsheet users. When the user is located within a predetermined proximity to other users within the list, the spreadsheet may be filtered to display the users within the proximity. The spreadsheet filtering may be performed at any level of granularity. For example, the filtering may be specified on a specific distance, a specific building, region, city, state, and the like.

The spreadsheet may also be automatically sorted based on location information. For example, the closest people to a user may be displayed first with the farthest people being displayed at the end of the list. Similarly, as the user moves through the different states, the closest states may be displayed first within the spreadsheet followed by the next closest and so on. A combination of filtering and sorting may also be defined.

Figure 4:
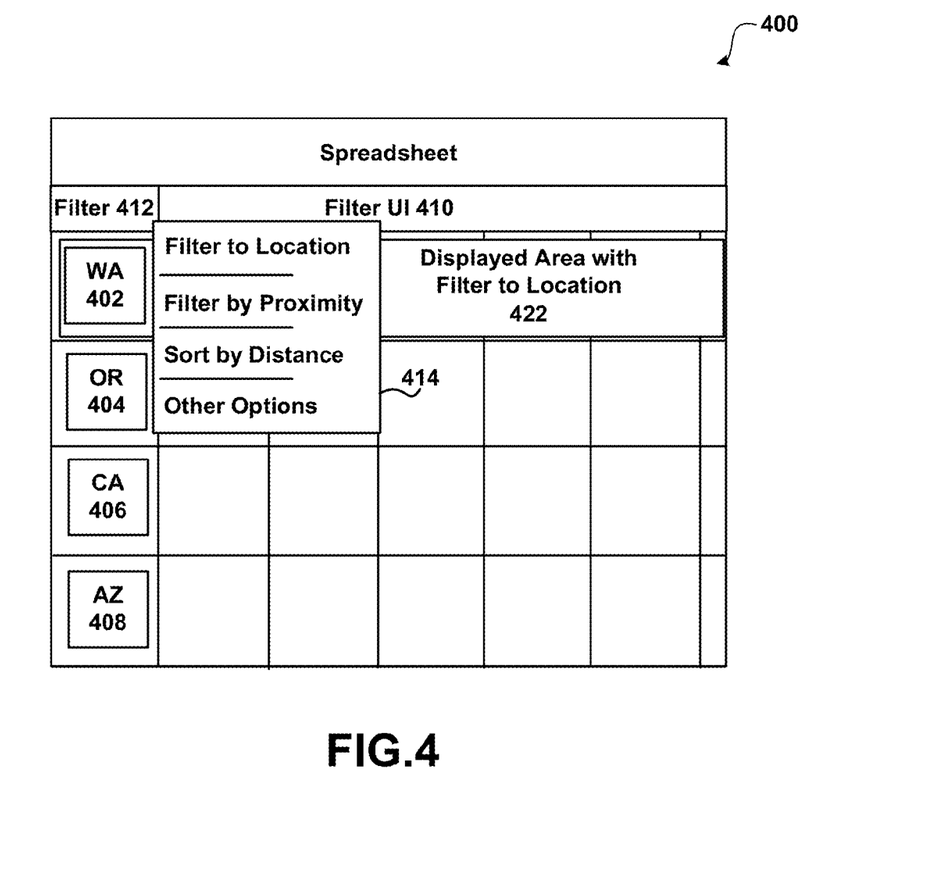
FIG. 4 shows an example spreadsheet with a location filtering user interface.

FIG. 4 shows an example spreadsheet 400 with a location filtering user interface. As illustrated, spreadsheet 400 state information for Washington, Oregon, California and Arizona. Spreadsheet 400 shows a row for WA 402, OR 404, CA 406 and AZ 408. Spreadsheet 400 also shows exemplary user interfaces that may be used for setting location based options, such as filter User Interface (UI) 410, filter menu 412 and menu 414. Many different type of UIs may be used to interact with various options. For example, the UI may be a context menu, a menu within a menu bar, a menu item selected from a ribbon user interface, a graphical menu, and the like. As illustrated, filter UI 410 is a user interface that is displayed above the columns that are contained within spreadsheet 400. Filter UI 410 may be displayed across all of the columns, a portion of the columns, or above one or more columns (e.g. filter menu 412). When a filter menu is selected various filtering options are available to be selected. For example, the filtering options may be presented in a menu, such as menu 414. The filtering options may comprise a variety of options, such as filter to a location (e.g. current or selected location), filter by proximity (e.g. show within a predefined area), sort by distance and other options. For example, the other options may include options to set preferences such as distances used in filtering, level of detail presented, how often to obtain location information, and the like. Displayed area with filter to location 422 is shown in row WA 402. A context menu may also be used to receive the filtering options. For example, a user may right click on a cell at which point a context menu may be displayed. The context menu may be similar to menu 414. The user may then select the filtering option.

Figure 5:
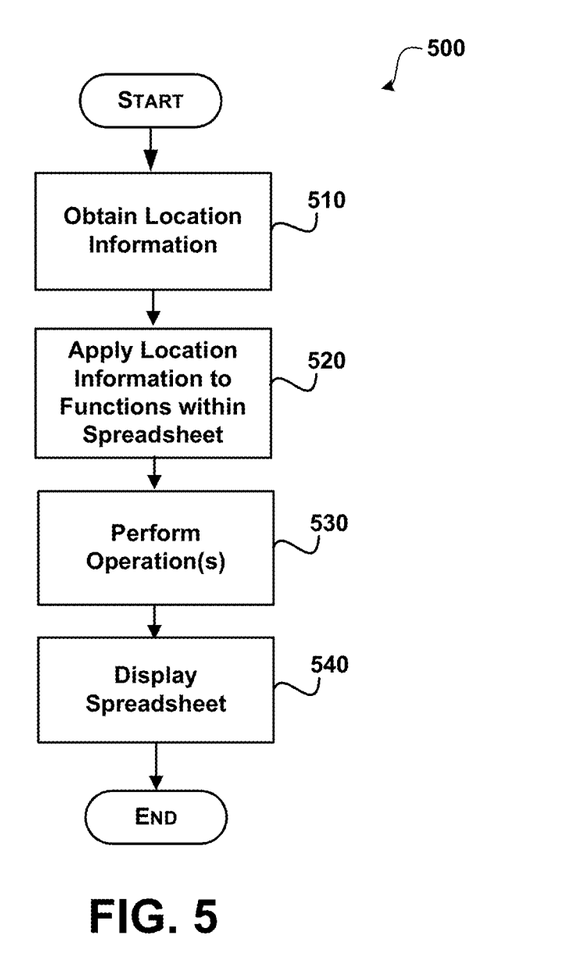
FIG. 5 shows an illustrative process for integrating location information into spreadsheets.

FIG. 5 shows an illustrative process 500 for integrating location information into spreadsheets. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, the process moves to operation 510, where location information is obtained. The location information may relate to the location of the user and to location of other users. For example, the location for the user may be obtained and the location for one or more other users may also be obtained. The location information may be obtained from a user, provided by sensors on the device and/or from some other location. For example, a location service may provide location information for the user and for the other users. The location information may provide varying levels of accuracy (e.g. a GPS may be very accurate, whereas an IP address may only be a rough estimate). The location information may also be obtained from a user. For example, a user may input their location information using a user interface.

Moving to block 520, the location information is used by the spreadsheet. The location information may be used to filter/sort the spreadsheet based on the location of the user and/or other user(s). Formulas within the spreadsheet may use the location information to perform or trigger some other operation. The location information may also be used to locate published data sources within the area. Other users within a specified vicinity of the user may also be located. Some of the formulas using the location information may specify that the obtained location information be converted to another location format. For example, GPS coordinates may be converted to a name of a location, a block, a city, and the like.

Transitioning to operation 530, the operations triggered by the location information are performed. For example, sending a message, starting a collaboration, filtering, surfacing a data source, changing a view of the spreadsheet, and the like.

Flowing to operation 540, the spreadsheet is displayed. As discussed, the display of the spreadsheet may be automatically modified based on a location of the user and/or other users. For example, as a user moves location the data that is displayed to the user within the spreadsheet may change.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using location information with a first spreadsheet, comprising:
   receiving, by a first computing device associated with a first user, location information for a physical location of a second user associated with a second computing device;
   in response to receiving the location information, automatically performing an operation on preexisting data within the first spreadsheet to create updated data, wherein the preexisting data comprises non-location values and location values, and wherein performing the operation on the preexisting data within the first spreadsheet comprises:
      determining that the second user is within a predetermined proximity;
      determining that data within a second spreadsheet on the second computing device is available for collaborating;
      determining identifiers in the first spreadsheet associated with the location values;
      automatically executing at least one native formula to create the updated data based on a predetermined condition satisfied by the location information, wherein the updated data is based at least in part on data within the second spreadsheet on the second computing device; and
      displaying the first spreadsheet with the updated data; and
   in response to receiving different location information, changing a display of the first spreadsheet in response to executing the at least one native formula based on the predetermined condition satisfied by the different location information.

2. The method of claim 1, further comprising determining a location of other spreadsheet users.

3. The method of claim 1, further comprising determining when a data source is near the user.

4. The method of claim 1, further comprising automatically filtering the display of the first spreadsheet in response to receiving the location information.

5. The method of claim 1, wherein displaying the first spreadsheet comprises automatically sorting the display of the updated data associated with the first spreadsheet in response to receiving the location information.

6. The method of claim 1, wherein determining the identifiers in the first spreadsheet associated with the location values comprises accessing the first spreadsheet and examining the first spreadsheet to determine at least one of: a row and a column that are associated with a location value and a spreadsheet object that is associated with a location value.

7. The method of claim 5, wherein a different portion of the first spreadsheet is automatically displayed in response to receiving different location information.

8. The method of claim 1, further comprising:
   performing an operation on the location information, wherein performing the operation on the location information comprises performing native location based functions comprising native location based formulas, wherein the native location based formulas comprise at least one of: a formula to convert the location information to different forms of location information, a formula to determine a location of a current user, and a formula to determine a location of another user.

9. The method of claim 1, further comprising:
in response to determining that data within the second spreadsheet is available for collaborating, beginning a collaboration session when the second user is within the predetermined proximity.

10. A first computing device associated with a first user comprising a processing unit and storing computer-executable instructions that when executed by the processing unit cause the first computing device to perform a method for integrating location information with a first spreadsheet, comprising:
receiving, by the first computing device, location information for a physical location of a second user associated with a second computing device;
in response to receiving the location information, automatically performing an operation on preexisting data within the first spreadsheet to create updated data, wherein the preexisting data comprises location values and non-location values, and wherein performing the operation on the preexisting data within the first spreadsheet comprises:
determining that the second user is within a predetermined proximity;
determining that data within a second spreadsheet on the second computing device is available for collaborating;
determining identifiers in the first spreadsheet associated with the location values; and
automatically executing at least one native formula based on a predetermined condition satisfied by the location information, wherein the updated data is based at least in part on data within the second spreadsheet on the second computing device;
displaying the first spreadsheet with the updated data; and
in response to receiving different location information, changing a display of the first spreadsheet in response to executing the at least one native formula based on the predetermined condition satisfied by the different location information.

11. The computing device of claim 10, further comprising determining a location of other spreadsheet users.

12. The computing device of claim 10, further comprising determining when a data source is near the user and surfacing the data source in a display.

13. The computing device of claim 10, wherein displaying the first spreadsheet comprises automatically filtering the display of the first spreadsheet in response to receiving the location information.

14. The computing device of claim 10, wherein displaying the first spreadsheet comprises automatically sorting the display of the first spreadsheet in response to receiving the location information.

15. The computing device of claim 10, further comprising automatically examining the first spreadsheet to determine at least one of: a row and a column that are associated with a location value.

16. The computing device of claim 10, further comprising:
performing an operation on the location information using a native location based formula comprising at least one of: a formula to convert the location information to different forms of location information, a formula to determine a location of a current user, and a formula to determine locations of other users.

17. A system associated with a first user for integrating location information with a first spreadsheet, comprising:
a central processing unit (CPU) and a computer storage media;
a display;
an operating environment stored on the computer storage media and executing on the CPU; and
a location manager operating under the control of the operating environment and operative to:
receiving, by the location manager, location information for a physical location of a second user associated with the second computing device;
in response to receiving the location information, automatically perform an operation on preexisting data within the first spreadsheet to create updated data, wherein the preexisting data comprises location values and non-location values, the location manager being further operative to:
determine that the second user is within a predetermined proximity;
determine that data within a second spreadsheet on the second computing device is available for collaborating;
determine identifiers in the first spreadsheet associated with the location values; and
execute, within the first spreadsheet, at least one native formula based on a predetermined condition satisfied by the location information to create the updated data, wherein the updated data is based at least in part on the data within the second spreadsheet on the second computing device;
display the first spreadsheet with the updated data; and
in response to receiving different location information, change a display of the first spreadsheet in response to executing the at least one native formula based on the predetermined condition satisfied by the different location information.

18. The system of claim 17, further comprising determining when a data source is near the user and surfacing the data source in a display.

19. The system of claim 17, wherein displaying the first spreadsheet comprises automatically filtering the display of the first spreadsheet in response to receiving the location information.

20. The system of claim 17, wherein displaying the first spreadsheet comprises automatically sorting the display of the first spreadsheet in response to receiving the location information.

* * * * *